United States Patent

[11] 3,576,340

[72] Inventors Robert S. Jones
Sunnyvale;
Jerry M. Long, Livermore, Calif.
[21] Appl. No. 838,985
[22] Filed July 3, 1969
[45] Patented Apr. 27, 1971
[73] Assignee Data Technology Corporation
San Jose, Calif.

[54] LATCH FOR DISC PACK PROTECTIVE COVER
11 Claims, 13 Drawing Figs.

[52] U.S. Cl. .......... 292/256, 220/55, 292/18, 292/51
[51] Int. Cl. .......... B65d 45/00, E05c 7/00, E05c 9/12
[50] Field of Search .......... 292/256, 341.17, 341.15, 80, 340, 90, 99, 301, 206, 256.71, 18, 51; 312/333; 220/43 (P), 60 (A), 55; 74/503; 285/308, 321, 340; 85/(Inquired); 24/(Inquired)

[56] References Cited

UNITED STATES PATENTS 2,479,960 8/1949 Osborn .......... 285/308X
2,637,576 5/1953 Nottingham .......... 292/99
3,447,819 6/1969 Borsum .......... 285/321X
3,451,702 6/1969 Little .......... 292/99

*Primary Examiner*—Marvin A. Champion
*Assistant Examiner*—Edward J. McCarthy
*Attorney*—Townsend and Townsend

ABSTRACT: A latch is disclosed for remotely engaging and disengaging the bottom cover plate of a protective casing for computer disc packs. Typically, the disc pack is fastened to the upper cover of the protective casing. Thereafter, the cover and attached disc pack are lowered so that the end of a threaded shaft protruding from the disc pack enters a latch on the bottom cover plate. At least one pawl interior of the latch engages the threads of the shaft fastening the bottom cover plate across the underside of the upper cover, completely encasing the disc pack. Disengagement of the bottom cover plate is effected by forcibly lowering the upper cover and attached disc pack towards the bottom cover plate. This causes the shaft of the disc pack to actuate the retraction of the pawl and release the bottom cover plate of the protective casing when the disc pack and upper cover are thereafter raised.

ROBERT S. JONES
JERRY M. LONG
INVENTOR.

BY
Townsend and Townsend

ROBERT S. JONES
JERRY M. LONG
INVENTOR.

BY
Townsend and Townsend

LATCH FOR DISC PACK PROTECTIVE COVER

This invention relates to a latch or lock mechanism for remotely engaging and disengaging a threaded shaft without manipulation of the member to which the latch is attached. The latch of this invention is particularly useful for remotely connecting and disconnecting the bottom cover plate of a protective casing for computer memory surfaces of the disc pack variety.

Disc packs include a plurality of discs having memory surfaces fastened in coaxial relation at preselected intervals along a solid shaft. The shaft of such disc packs has a lower and protruding exposed threaded portion used for grasping and rotating the discs at high speed when the disc pack is in use on a computer console. When such disc packs are moved from the computer console, their fragile and delicate memory surfaces require that they be placed within a protective casing. This protective casing prevents dirt, moisture and physical abuse from either damaging the disc packs or destroying the information recorded thereon.

As is well known in the art, the top cover for such protective casings includes a locking mechanism for grasping and thereafter lifting the disc pack from the computer console. This top cover member has attached thereto cylindrical sidewalls which extend downwardly over the sides of the disc pack. When the disc pack is removed by the top cover from the console, it is necessary to fasten a bottom cover plate across the bottom of the top cover sidewalls to completely seal the unit.

Heretofore, bottom cover plates of disc pack protective casings have had to be separately handled and fastened to the disc packs for complete protective sealing of the computer memory unit. Such separate handling is necessitated by a threaded member in the bottom cover plate which attaches to the disc pack. This requires that the disc pack and upper cover member be lifted or turned on their side. Thereafter, the bottom cover plate is individually grasped, usually at its threaded member. With the disc pack held in one hand, and the bottom cover member held in the other hand, the units are fastened together by rotation of the threaded member attached to the bottom cover plate.

Unfortunately, such one-handed lifting and turning of the disc packs and upper cover member in one hand, and lifting and threading of the bottom cover plate in the other hand greatly multiplies the possibilities of damage to these fragile and expensive memory components. Often, disc packs are dropped. The fragile memory surfaces are frequently bent or broken. This necessitates expensive replacement of the disc packs. Moreover, valuable information recorded on these memory surfaces is frequently, irretrievably lost.

Accordingly, it is an object of this invention to disclose a latch for fastening the bottom cover plate of a disc pack protective cover remotely without requiring separate handling of the bottom cover plate nor any member attached thereto. The disc pack and attached upper cover are lowered in overlying relation to the bottom cover plate. The downwardly protruding and threaded portion of the disc pack is received within an aperture defined by a latch attached to the inside of the bottom cover plate. Upon initial insertion of the threaded shaft of the disc pack into the latch, pawls interior thereof engage the threads of the disc pack shaft. Subsequent raising of the disc pack through its attached cover, causes the bottom cover plate to be raised in sealed relation across the bottom of the upper cover fully encasing the disc pack. When disengagement is desired, the upper cover plate and disc pack are pushed further downwardly onto the bottom cover plate and attached latch. This second downward motion actuates pawls within the latch mechanism to move to a retracted position where they no longer engage the threads of the disc pack shaft. This permits separation of the bottom cover plate when the disc pack and attached cover are subsequently raised.

An advantage of this invention is that a disc pack can be completely encased within its protective cover with only one hand and without the necessity of turning the relatively heavy disc pack and attached upper cover member on its side. Accordingly, computer operators can grasp and seal a disc pack in its protective casing with one hand without overexertion and with small risk of disc pack damage.

A still further advantage of this invention is that the latch mechanism of this invention, as attached to the bottom cover plate, secures to the exposed threads at the bottom of the disc pack and does not require the threading of additional fastening members mounted to the cover bottom.

A still further advantage of this invention is that the latch mechanism when engaged or disengaged imparts to the manipulated top cover plate and disc pack a positive engaging interlock which may be perceived by feel. This enables the relatively inexperienced operator to learn rapid manipulation of the improved protective cover of this invention.

A still further advantage of this invention is that the lock apparatus here disclosed is compact, and therefore easily placed in an unobstructing location on the bottom cover plate without interference with either the disc pack or its attached upper cover.

Other objects, features and advantages of the present invention will be more apparent after referring to the following specification and attached drawings in which.

Figures 1, 2, 3, 4, 5:
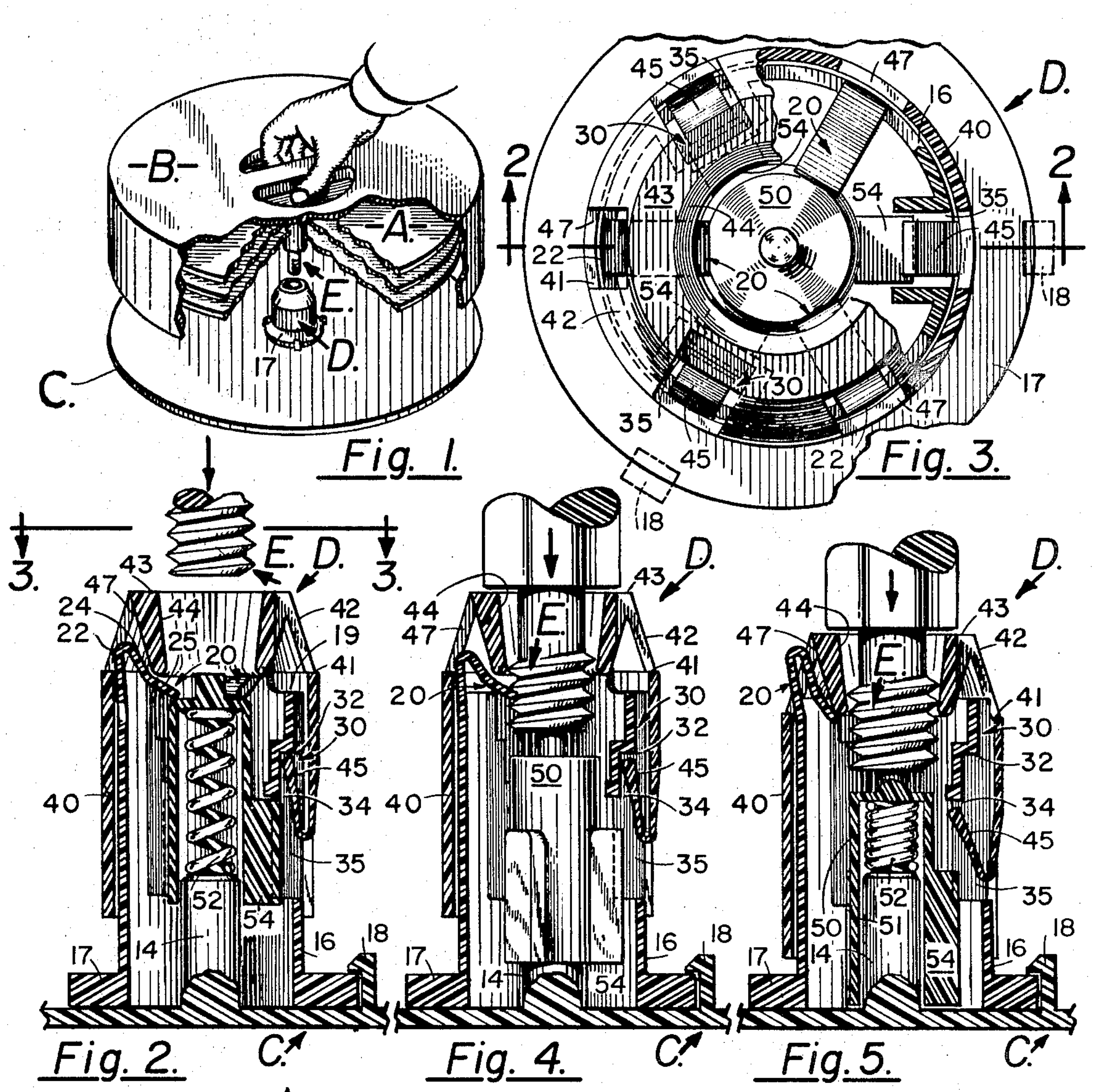
FIG. 1 is a perspective view of a disc pack and protective casing, the upper cover of the protective casing illustrated broken away and shown attached to the disc pack; both the cover and disc pack are shown being lowered overlying the bottom cover plate of the protective casing to a position where the exposed threaded shaft of the disc pack will engage the latch of this invention.
FIG. 2 is a side elevation section of the latch mechanism of FIG. 1.
FIG. 3 is a plan view of the latch mechanism along lines 3–3 of FIG. 2.
FIG. 4 is a side elevation section similar to that of FIG. 2 showing the exposed threaded shaft of the disc pack in locking engagement within the latch.
FIG. 5 is a side elevation section similar to FIG. 4 showing the exposed threaded shaft being disengaged from the latch.

With reference to FIG. 1, disc pack A attached to upper cover B of a protective casing is shown being lowered overlying bottom cover plate C of the protective casing. Concentrically mounted to and protruding upwardly from the central portion of cover plate C, latch D of this invention is illustrated disposed for engagement with the lower and protruding threaded shaft E of the disc pack.

As will hereinafter be illustrated in detail, when enclosing engagement of bottom cover plate C across the bottom of upper cover B is desired, the upper cover and attached disc pack are lowered. Threaded shaft E of disc pack A fits concentrically into the interior of latch D. Upon initial lowering, locking of the cover plate C to the threaded shaft E occurs through the protruding pawl interior of the latch. This locking of latch D seals and protects the disc pack and its fragile memory surfaces from moisture, dust and physical damage.

When release of the cover plate C from the disc pack A and cover B is desired, cover B is pressed further downward and towards latch D and bottom cover plate C causing threaded shaft E to further move toward and penetrate the latch. This movement of shaft E actuates retraction of the pawls interior of the latch and enables upper cover B with disc pack A attached to be released from bottom cover plate C.

Referring now to the first embodiment of the latch of this invention illustrated in FIGS. 2—6, and with particular reference to FIG. 2, bottom cover plate C is shown having shaft 14 integrally attached to the cover plate. Shaft 14 is located concentrically of bottom cover plate C and extends axially upward into the latch D of this invention.

Fastened to cover plate C coaxially about shaft 14 there is a hollow cylinder 16. Provided at the lower portion of cylinder 16 there is an annular flange 17. Cylinder 16 is fastened to the bottom cover plate C typically by resilient hooked members 18 grasping its periphery as shown in FIGS. 2 through 6.

Cylinder 16 supports at its upper wall 19 three pawls 20 (see FIGS. 2 and 3). Pawls 20 are here shown spaced at 120° intervals about the axis of cylinder 16. Each pawl 20 has an upwardly protruding support arm 22 which comprises an extension of the sidewalls of cylinder 16. At the topmost portion, pawls 20 extend at an acute angle downwardly and inwardly of the interior of cylinder 16.

The inwardly extending portion of each of the pawls includes two angularly inclined sections 24 and 25. First angularly inclined section 24 extends approximately two-thirds the length of the pawl from the upper end of support arm 22 into the interior of cylinder 16. As shown in FIG. 2, this pawl delimits an angle of approximately 30° between the interior sidewall of cylinder 16 and its inward surface. Second section 25 of each of the pawls extends from the end of first section 24 inwardly toward the axis of cylinder 16. As shown in FIG. 2, this section describes an angle of approximately 60° between the inside wall of cylinder 16 and its inside surface. Second section 25 has at its end the surface which engages the threaded shaft E of the disc pack and terminates overlying shaft 14.

The three pawls engage threaded shaft E simultaneously. As the threads are disposed in a helix on the threaded shaft, the elevation of the pawl extremities can be stepped to correspond to the pitch of the threads.

Pawls 20 are each formed of an elastic, semirigid material such as nylon, plastic, or the like. The need for this elastic, semirigid construction will become more apparent as the operable deflection of these members is illustrated more fully with reference to FIGS. 2, 4, 5 and 6.

Diametrically opposite each of the pawls 20 there is defined in the sidewalls of cylinder 16 three indented lug engaging surfaces 30. As will be more fully set forth hereinafter, surfaces 30 cooperate in the capture and release of pawls 20 permitting remote engagement and disengagement respectively of threaded shaft E with latch D.

Indented lug-engaging surface 30 extend axially downward of the sidewalls of cylinder 16. At their upper portion, where they are attached integrally with the walls of cylinder 16, surfaces 30 are radially indented inwardly towards the axis of cylinder 16 approximately the thickness of the cylinder sidewalls. From the bottom of this first or upper radial indentation, the surfaces have interior extending length, which length extends radially further inwardly towards the axis of cylinder 16. This length defines on its lower and outer portions a first or upper lug-engaging step 32. At the end of the first inwardly protruding portion the lug-engaging surfaces extend downwardly a preselected distance terminating at a lower or second lug-engaging step 34.

Below lower lug-engaging steps 34, cylinder 16 has apertures 35. Apertures 35 extend longitudinally of the indented sidewall of cylinder 16 and, as will become more fully apparent hereinafter, permit the entry of lugs 45 which cooperate in the capture and release of pawls 20 and guide the fins 54 attached to plug 50.

With reference to FIGS. 3 and 4, the sliding cylinder 40 of this latch mechanism which functions to capture and release pawls 20 is illustrated. Typically, cylinder 40 has an inside diameter slightly greater than the outside diameter of cylinder 16. In length, cylinder 40 is less than the length of cylinder 16 and moves in sliding engagement over the outside surface of cylinder 16.

At its upward end 41, cylinder 40 tapers in a frustum 42 inwardly towards its axis and away from end 41. At the topmost portion, frustum 42 defines a shoulder 43 which coincides with and contacts the inside surface of a corresponding area on the disc pack located around and adjacent to threaded shaft E. From shoulder 43, an inwardly extending frustum 44 extends downwardly and towards end 41 of sliding cylinder 40. This frustum, at its side surface exposed to threaded shaft E, guides the shaft into latch D. At its surface exposed to pawls 20, frustum 44 functions to capture the pawls 20 when release of shaft E is desired.

Integrally attached to sliding cylinder 40 and formed from a portion of the sidewalls thereof there are three lugs 45. Lugs 45 are spaced at 120° intervals from the sidewalls of cylinder 40. Lugs 45 protrude upwardly from the lower portion of sliding cylinder 40 extending upwardly and inwardly of sliding cylinder 40 into the indented lug-engaging surfaces 30 of cylinder 16. As will be set forth more fully hereinafter, these lugs function to engage first lug-engaging steps 32 when pawls 20 are operable to engage threaded shaft E and second lug-engaging steps 34 when pawls 20 are captured and held out of engagement with threaded shaft E.

Overlying each of the pawls 20, frustum 42 has configured therein three pawl apertures 47 at 120° intervals about the frustum. These apertures 47 each permit a pawl when in the captured position illustrated in FIG. 5 to protrude outwardly through the top of sliding cylinder 40 at frustum 42.

With reference to FIG. 5, the plug 50 is illustrated. Plug 50 has an inside bore 51 which defines an interior diameter exceeding the outside diameter of shaft 14. As is visible in the sequence of FIGS. 2, 4, 5 and 6, a coil spring 52 mounted between the upper outside surface of shaft 14 and the upper inside wall of plug 50 permits spring-biased slideable movement of the plug in opposition to forces exerted thereon through threaded shaft E.

Configured about the lower portion of plug 50 there are three fins 54 spaced at 120° intervals about plug 50. These fins fit into apertures 35 in cylinder 16 and function to disengage lugs 45 from second lug-engaging steps 34 when release of pawls 20, from their capture by sliding cylinder 40, is desired.

Having set forth the individual components of the invention set forth in FIGS. 1—6, operation of latch D to engage and disengage threaded shaft E of disc pack A will now be described. With reference to FIG. 2, the disposition of the latch prior to engagement of threaded cylinder is illustrated. Typically, plug 50 is biased upwardly by coil spring 52 into engagement with second plug-engaging steps 34 at fins 54. Sliding cylinder 40 is biased upwardly by pawls 20 bearing on frustum 44 into a position where lug 45 engages first lug-engaging step 32.

As shown in FIG. 4, when threaded shaft E is inserted interiorly of the latch mechanism, it is guided into sliding engagement with the end of plug 50 by inward surface of inward frustum 44. Shaft E, passing into abutting engagement with the end of plug 50, depresses lug 50 and passes pawls 20. This motion compresses spring 52. As the cylinder passes by the pawls, they yield downwardly and inwardly of the hollow cylinder 16 to which they are attached producing a rachetlike engagement with the individual threads of shaft E. As is readily apparent, attempts to withdraw shaft E against the rachet action of pawls 20 will result in the latch D being firmly attached to the shaft E. This will result in the bottom cover plate C being held across the bottom of upper cover B protecting the disc pack A from moisture, dirt, and physical abuse.

Figure 6:
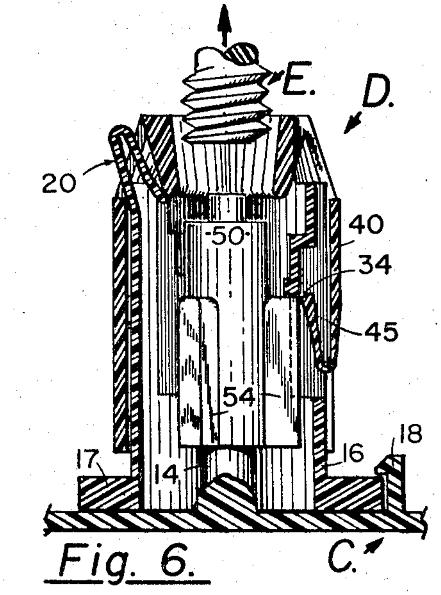
FIG. 6 is a side elevation section similar to FIG. 5 showing the disengaged shaft being withdrawn from the latch and the mechanism interior of the latch returning to the position illustrated in FIG. 2.

Release of threaded shaft E from lock mechanism D is illustrated subsequentially in FIGS. 5 and 6. When release is desired, cover B is depressed further towards bottom cover plate C (see FIG. 5). This depression causes threaded shaft E to advance further against the end of plug 50 causing the plug 50 to pass downwardly compressing coil spring 52 against the end of shaft 14. At the same time, the frustum surrounding shaft E bears against frustum 42 and depresses sliding cylinder 40. This contact causes sliding cylinder 40 to move downwardly.

Upon downward movement of sliding cylinder 40, two functions occur. First, pawls 20 are captured at the lower extremity of inner frustum 44. Secondly, and once this capture has taken place, lugs 45 engage lower lug-engaging steps 34. This engagement maintains pawls 20 captured and prevents upward sliding movement of sliding cylinder 40.

With reference to FIG. 6, once pawls 20 are captured, shaft E may be withdrawn by a continuous upward movement. As shaft E is withdrawn, plug 50 moves upwardly and into contact with second lug-engaging surface 34 at fins 54. This upward movement forces lugs 45 out of engagement with second lug-engaging surfaces 34 and permits sliding cylinder 40 to move upwardly by the bias produced by captured pawls 20 against the lower surface of inner frustum 44. As previously described, the bias of pawls 20 against lower frustum 44 will cause sliding cylinder 40 to move upwardly until lugs 45 engage first lug-engaging steps 32. This will return the latch mechanism to the original disposition illustrated with respect to FIG. 2.

With reference to FIGS. 7—13, latch D′ is illustrated which produces the same locking function through use of an alternate latch construction.

With reference to FIGS. 7, 11, 12 and 13, latch D′ includes a frustoconical base 70 mounted about the central portion of bottom cover plate C. Frustoconical base 70 extends upwardly from cover plate C a preselected distance and terminates in a flat end wall 71.

End wall 71 has configured in the central portion thereof a shaft receiving cylinder 72. This cylinder is defined by sidewalls 73 extending downwardly from wall 71 into the frustoconical base.

Shaft receiving cylinder 72 has an inside diameter slightly greater than the outside threaded diameter of threaded shaft E. At the bottom portion, the sidewalls 73 have slots 74 defined therein to permit resilient movement towards and away from one another. Walls 73 have configured in their lower end hook members 75.

Attached to the central portion of bottom cover plate C there is a shaft 80 having an upward annular flange 81. Flange 81 permits fastening of frustoconical base 80 at hook member 75. Typically, the frustoconical base is inserted downwardly and over the shaft 80 at its annular flange 81. When such insertion occurs, the slotted sidewalls 73 at hook member 75 resiliently move outwardly and thereafter lock on the bottom surface of annular flange 81, securing the frustoconical base 70 firmly to the bottom cover plate C.

Attached to the wall 71 of frustoconical base 70 there are two pairs of U-shaped members 84. Members 84 are each affixed to surface 71 at the bottom portion of the U and have the two legs of the U facing upwardly and away from frustoconical base 70. As can be seen, each pair of U-shaped members 84 is separated by a preselected interval spaced equidistantly on either side of the shaft receiving aperture 72. As will hereinafter appear, these U-shaped apertures function to receive two rotating shafts 90 having wheels 94 attached thereto for successively locking and releasing threaded shaft E interior of latch mechanism D′.

Figure 7:
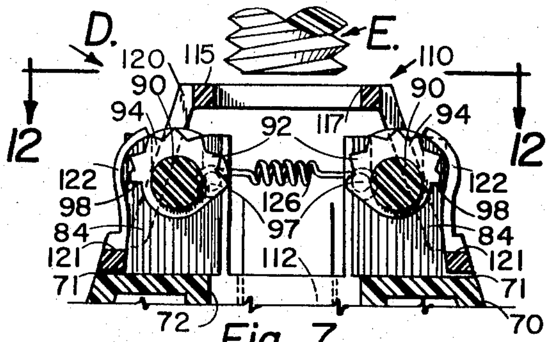
FIG. 7 is a side elevation section of an alternate embodiment of this invention in which two rotating pawl members on opposed sides of the latch are disposed for engaging the downwardly moving threaded shaft on the disc pack.
Figures 11, 12:
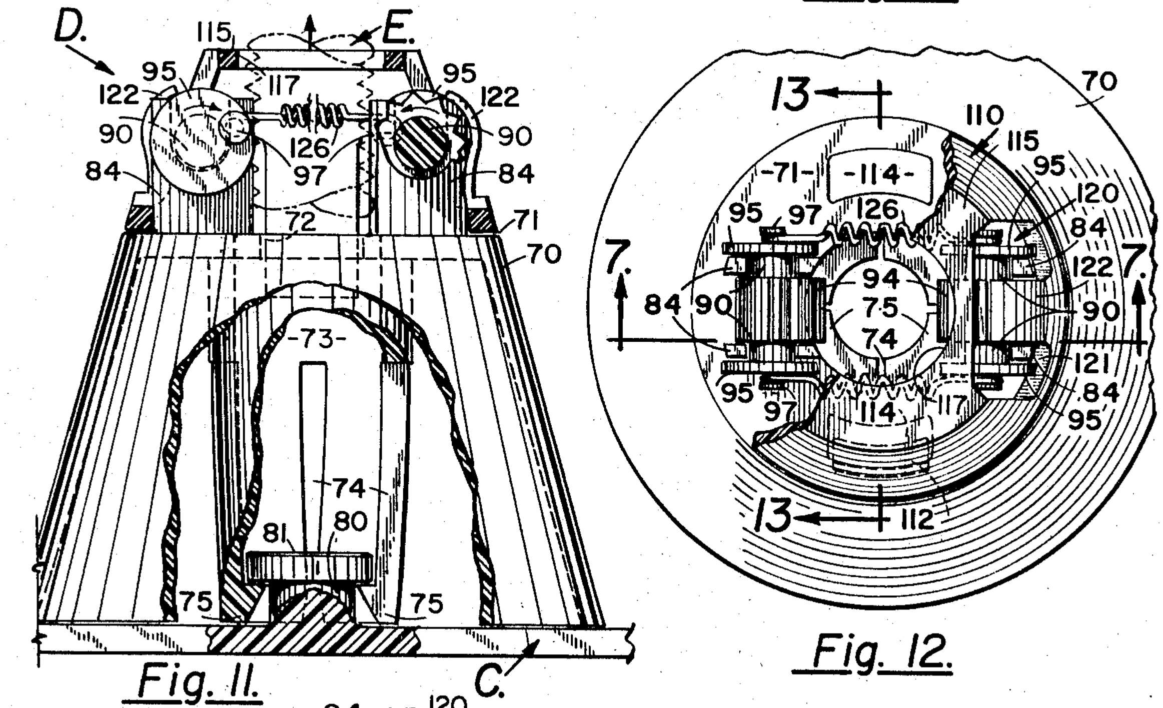
FIG. 11 shows the latch mechanism during removal of the threaded shaft and the position of the mechanism interior of the latch immediately prior to return to the position illustrated in FIG. 7.
FIG. 12 is a plan view of the alternate embodiment of this invention taken along lines 12–12 of FIG. 7.
Figure 13:
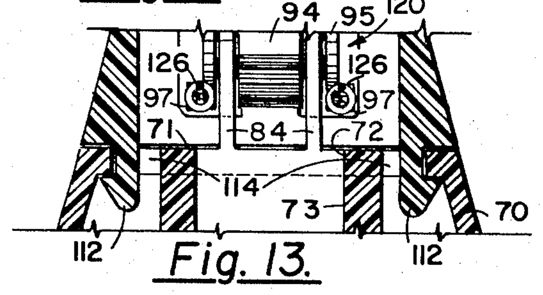
FIG. 13 is a side elevation taken along lines 13–13 of FIG. 12 illustrating apparatus for fastening the latch mechanism together.

Referring to FIGS. 7 and 12, the construction of wheels 94 attached to rotating shaft 90 can be illustrated. Typically, shaft 90 has an overall length that extends between U-shaped members 84. In the interval between the U-shaped members, there is wheel 94, which wheel has a thickness axially on shaft 90 slightly less than the intervals between each of the paired U-shaped members 84. At either end of shaft 90 there is an annular flange 95. Flange 95 functions to prevent axial movement of shaft 90 relative to the U-shaped members and has attached thereto two spring fastening lugs 97.

Lugs 97 and pawls or teeth 92 on wheel 94 are each cooperatively located about shaft 90 to permit operation of the latch mechanism. Referring specifically to FIG. 7, pawls 92 commence on the exterior of wheel 94 at that radially indexed location relative to shaft 90 where lugs 97 are located on annular flanges 95. Pawls 92, each individually spaced for receiving the individual threads of shaft E, extend approximately 180° about the periphery of racheted wheel 94. On racheted wheel 94 at a radially indexed location 180° removed from the axial location of lugs 97 on annular flanges 95 the pawls cease and terminate in a spring contact surface 98. Thereafter, and for the remaining 180° of wheel 94, the wheel has a reduced diameter.

As can be seen in FIG. 7, each pair of U-shaped members 84 carries a shaft 90 and partially racheted wheel. Relative to the upward portion of the latch mechanism D′ as is viewed in FIG. 7, left-hand shaft 90 has its pawls 92 disposed counterclockwise from the axial location relative to shaft 90 of spring fastening lug 97. Conversely, right-hand shaft 90 has its pawls 92 disposed clockwise from the axial location relative to shaft 90 of spring fastening lug 97. As will more fully hereinafter appear, this disposition of the pawls 92 relative to the entering shaft E permits engagement by the shaft of the pawls when downward movement of shaft E first occurs.

Resting on top surface of wall 71 of frustoconical base 70 there is a latch mechanism cover 110 (see FIGS. 7 and 12). Cover 110 has a frustoconical elevation, which frustoconical elevation furnishes substantially a continuation of the frustum of base 70.

Attachment of cover 110 is effected by two hook-shaped latches 112 which pierce through apertures 114 configured in the upper surface 71 of base 70. These hook-shaped latches 112 each fasten interiorly and underneath surface 71 so as to affix the cover firmly over wheel 94 and to maintain wheels 94 captured within the U-shaped member 84. Similar to base 70, cover 110 has at the top portion thereof a wall 115 which closes the end portion of the frustum defined by the cover 110. Wall 115 has configured therein its own shaft receiving aperture 117, which aperture has an inside diameter slightly greater than the outside diameter of threaded shaft E.

As specifically shown in FIG. 12, cover 110 has configured therein at 180° intervals two wheel apertures 120. Each of the apertures extends partially downward of the sidewalls of cover 110 and has a profile relative to the U-shaped members 84 permitting exposure of the rachet wheel but maintaining shaft 90 within U-shaped member 84.

With reference to FIG. 7 and at lower portion 121 of each of the apertures 120 there are two arcuate leaf springs 122 fastened. Leaf springs 122 extend upwardly from the lower portion of aperture 120 arcuately over each wheel 94 so as to be in contact with the outside surface thereof. These springs are biased inwardly over the wheels serving to cooperatively lock these wheels when engagement and disengagement, respectively, of threaded shaft E is desired.

Extending between each of the spring fastening lugs 97 on shaft 90 across the opposite shaft 90 to its lugs 97 there is a coil spring 126. As will hereinafter more fully appear, spring 126 functions to cause simultaneous rotation of the wheels 94 effecting release of threaded shaft E and retraction of the pawls 92 to a shaft receiving position at the end of each operative cycle of the latch mechanism D.

Having set forth the construction of the latch mechanism, its operation may now be described with references to FIGS. 7—11.

With reference to FIG. 7, each of wheels 94 has its respective pawls 92 disposed upwardly and towards entering shaft E. Coil spring 126, under tension between the lugs 97 on each end of the respective shafts 90 causes the partially racheted wheels 94 to assume this disposition.

Figure 8:
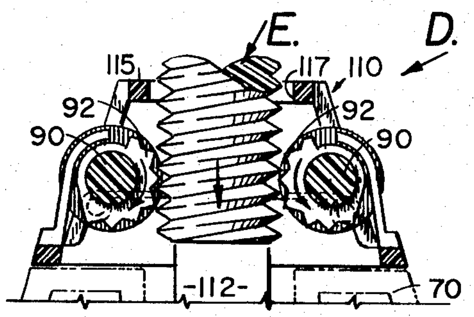
FIG. 8 is a side elevation section similar to FIG. 7 illustrating rotation of the two pawl members when the cylinder is inserted interior of the latch.

As illustrated in FIG. 8, when shaft E enters interior of aperture 117 in cover 110 and passes downwardly into contact with the pawls 92 of wheels 94, rotation of each of the shafts 90 occurs. Left-hand shaft 90 rotates in a clockwise direction; right-hand shaft 90 rotates in a counterclockwise direction. Pawls 92 of each wheel 94 engage the successive threads of threaded shaft E.

Figure 9:
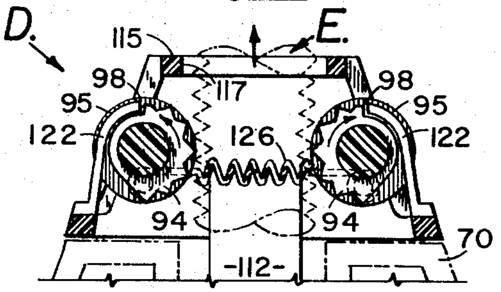
FIG. 9 is a side elevation section similar to FIG. 8 showing engagement of the shaft within the latch through the rotating pawl members.
Figure 10:
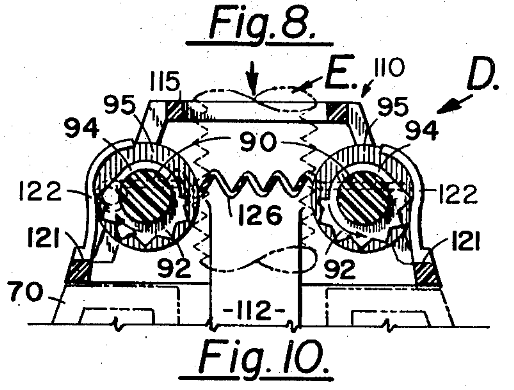
FIG. 10 is a side elevation section similar to FIG. 9 illustrating release of the latch by further downward movement of the exposed and threaded shaft.

As illustrated in FIG. 9, rotation of the threaded shaft E continues until spring contacting surface 98 rotates beyond arcuate leaf spring 122. When such rotation occurs, the arcuate leaf spring moves inwardly into the reduced diameter section of wheels 94. Consequently, when attempt is made to remove threaded shaft E from engagement interior of the latch mechanism D′, spring 122 arrests rotation of wheels 94 locking shaft E within latch mechanism D′. This fastens the cover plate across the bottom of the upper cover B capturing the disc pack A in a covered and protected disposition.

When removal of shaft E from latch mechanism D′ is desired, shaft E is further inserted interior of latch mechanism D′. This causes further rotation of the partially racheted wheels 94 causing lugs 97 to pass to a point where they are above the respective centers of each of the rotating shafts 90. When this occurs, spring 126 extending between each of the lugs 97, on the opposing shafts 90 causes the shafts 90 to rotate. Left-hand shaft 90 rotates in a clockwise direction; right-hand shaft 90 rotates in a counterclockwise direction. This rotation causes the pawls 92 of the partially racheted wheels 94 to pass out of engagement with the threaded shaft and exposes that portion of the wheels 90 having no pawls 92 thereon to the threads.

Withdrawal of shaft E is illustrated with respect to FIG. 11. Typically, shaft E is pulled upwardly. The pawls 92 cause rotation of wheel 94 with movement of the individual threads on the threaded shaft E permitting the shaft to slide out of engagement with the latch mechanism D′. When the threaded shaft E is completely withdrawn, the latch mechanism completes its cycle and returns to the disposition originally illustrated with respect to FIG. 7.

In both illustrated embodiments, it should be apparent that threaded shaft E can either be provided with the helical threads here illustrated or alternately with a series of annular grooves, the only limitation being that the pawls be provided with a sufficient surface for locking engagement on shaft E.

These and other modifications of our invention may be practiced, it being understood that the form of our invention as described above is to be taken as a preferred example of the same. Such description has been by way of illustration and example for purposes of clarity and understanding. Changes and modifications may be made without department from the spirit of our invention.

We claim:

1. In a protective casing for a disc pack wherein an upper cover is adapted to fasten to the top of said disc pack and a bottom plate is adapted to fasten to the lower and protruding threaded shaft of said disc pack to form a protective enclosure, the improvement comprising: a latch mechanism mounted to the bottom cover, said latch mechanism defining an upwardly open aperture therein positioned for receiving the threaded shaft when said bottom plate is positioned across the bottom of said upper cover to form said protective enclosure; pawl means attached to said latch mechanism and laterally movable into said path into a threaded engagement position and out of said path to a shaft release position; and, pawl control means for positioning said pawl in said threaded engagement position in response to movement of said shaft to a predetermined point of partial penetration along said path into said aperture so that said pawl means engages said shaft to prevent withdrawal from said housing, said pawl control means further including means for retracting said pawl means in response to penetration of said shaft along said path beyond said predetermined point of partial penetration so that said shaft can be withdrawn from said aperture in said latch housing.

2. The invention of claim 1 and wherein: said pawl means comprises at least one pawl; means resiliently mounting said pawl to said housing.

3. The invention of claim 2 and wherein: said retracting means includes a retracting member movable towards and away from said pawl, said retracting member including a surface for biasing said pawl out of said path to said shaft release position when moved toward said pawl.

4. The invention of claim 3 and wherein: said retracting means is movable towards said pawl in response to movement of said shaft at a point beyond initial penetration of said shaft into said aperture.

5. The invention of claim 1 and wherein: said pawl means includes at least one pawl; means mounting said pawl for rotatable movement to said housing at a position to permit said pawl to rotate into said path into a threaded engagement position and out of said path to a shaft release position.

6. The invention of claim 5 and including: means for biasing said pawl into said path is attached to said rotatable mounting means.

7. Apparatus for releasably latching a first member having a shaft extending therefrom to a second member comprising: a hollow mounting cylinder mounted on said second member and defining a cylindric cavity for receiving said shaft, said mounting cylinder having integral therewith at the end remote from said second member at least one resilient pawl that extends radially into said cavity, said pawl having at the inner end thereof a shaft-engaging surface and at a medial region thereof a downward and inward extending surface portion, a hollow sliding cylinder telescoped on the exterior of said mounting cylinder, said sliding cylinder having at the outer end thereof a downward and inward extending frustum that defines an annular face for bearing on said pawl surface so that inward axial movement of said sliding cylinder retracts said shaft-engaging surface radially outwardly of said cavity, said frustum having an axial extent less than said shaft so the shaft can be moved into said cavity to a first intermediate position for engagement by said pawl and to a second position inward of said first position at which said pawl is retracted out of said cavity, said sliding cylinder having at least one radially inward extending lug disposed axially inward of said frustum for retaining said sliding cylinder in said second position, said mounting cylinder having a lug-engaging step for cooperating with said lug, said step being axially disposed so as to engage said lug in said second position, and means disposed in said cavity for disengaging said lug from said step in response to penetration of said shaft into said cavity to a third position inward of said second position.

8. A latch mechanism comprising: a threaded shaft, a latch housing having an aperture defining a path for receiving said threaded shaft; pawl means including at least one wheel; at least one pawl mounted on the circumference of the wheel; means for rotatably mounting said wheel on said latch housing with respect to said aperture to permit rotation of said pawl into said path and into an engagement position with said threads and out of said path to a shaft release position relative to said threads and, pawl-control means for positioning said pawl in said threaded engagement position in response to movement of said shaft to a predetermined point of partial penetration along said path into said aperture so that said pawl means engages said shaft to prevent withdrawal from said housing, said pawl-control means further including means for retracting said pawl means in response to penetration of said shaft along said path beyond said predetermined point of partial penetration so that said shaft can be withdrawn from said aperture in said latch housing.

9. A latch mechanism comprising: a shaft defining a plurality of ridges spaced axially along said shaft; a latch housing having an aperture defining a path for receiving said shaft and ridges; pawl means attached to said latch housing and laterally movable into said path into an engagement position with said ridges and out of said path to a shaft-release position away from said ridges; and, pawl-control means operatively attached to said latch housing relative to said ridges for positioning said pawl in said engagement position in response to movement of said shaft to a predetermined point of partial penetration along said path into said aperture so that said pawl means engages said ridges of said shaft to prevent withdrawal from said housing, said pawl-control means being separable from said shaft and further including means for retracting said pawl means out of contact with said shaft in response to penetration of said shaft along said path beyond said predetermined point of partial penetration so that said shaft can be withdrawn from said aperture in said latch housing without contact by said pawl and, means for restoring said pawl means to said threaded engagement position in response to withdrawal of said shaft from said housing.

10. The invention of claim 9 and wherein: said pawl means includes at least one pawl; and, elastic means resiliently mounting said pawl to said housing adapted to permit elastic deflection of said pawl from said threaded engagement position to said shaft-release position.

11. The invention of claim 9 and wherein: said retracting means includes a retracting member movable toward and away from said pawl, said retracting member defining a surface for biasing said pawl out of said path to said shaft-release position during positioning of said retracting member towards said pawl.

PO-1050
(5/69)

UNITED STATES PATENT OFFICE
CERTIFICATE OF CORRECTION

Patent No. 3,576,340 Dated April 27, 1971

Inventor(s) Milton B. Frankel

It is certified that error appears in the above-identified patent and that said Letters Patent are hereby corrected as shown below:

Column 2, line 8, after "$NO_2$", delete "and wherein";

line 9, delete "R' is H or $NO_2$".

Column 4, lines 14-16, correct the formula to read:

(2) 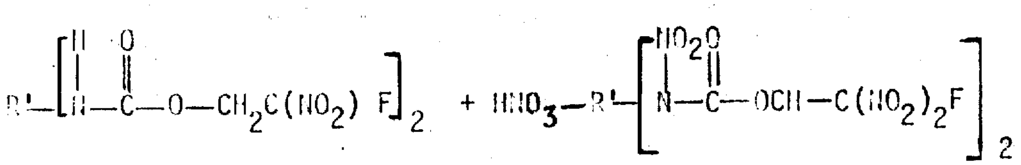

Column 4, lines 24-25, correct the formula to read:

(3) $MCl_n + nHOCH_2(NO_2)_2F \rightarrow M\{OCH_2C(NO_2)_2F\}_n + HCl$

Claim 1. Correct the formula to read:

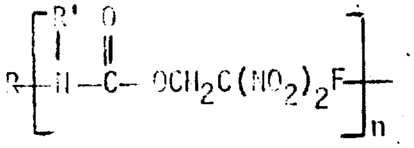

Signed and sealed this 16th day of November 1

(SEAL)
Attest:

EDWARD M. FLETCHER, JR.
Attesting Officer

ROBERT GOTTSCHALK
Acting Commissioner of Patents